(12) United States Patent
Ito

(10) Patent No.: US 9,027,719 B2
(45) Date of Patent: May 12, 2015

(54) ADJUSTER AND SHOCK ABSORBER

(75) Inventor: Mikio Ito, Minokamo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 113 days.

(21) Appl. No.: 13/515,744

(22) PCT Filed: Mar. 17, 2011

(86) PCT No.: PCT/JP2011/056358

§ 371 (c)(1),
(2), (4) Date: Jun. 13, 2012

(87) PCT Pub. No.: WO2011/122358

PCT Pub. Date: Oct. 6, 2011

(65) Prior Publication Data

US 2012/0255822 A1    Oct. 11, 2012

(30) Foreign Application Priority Data

Mar. 29, 2010    (JP) ................................. 2010-074188

(51) Int. Cl.
*F16F 9/32* (2006.01)
*F16K 5/10* (2006.01)
*F16F 9/44* (2006.01)

(52) U.S. Cl.
CPC . *F16F 9/325* (2013.01); *F16K 5/10* (2013.01); *F16F 9/446* (2013.01)

(58) Field of Classification Search
CPC ................ F16K 3/32; F16K 5/10; F16F 9/44; F16F 9/096; F16F 9/325; F16F 9/446

USPC ........................... 188/314; 251/208, 219–220
See application file for complete search history.

(56) References Cited

U.S. PATENT DOCUMENTS

| | | | | |
|---|---|---|---|---|
| 3,306,572 A | * | 2/1967 | Dove | 251/297 |
| 3,475,005 A | * | 10/1969 | Semon | 251/111 |
| 4,328,832 A | * | 5/1982 | Inada et al. | 137/625.4 |
| 2007/0252349 A1 | * | 11/2007 | Noguchi | 280/5.5 |

FOREIGN PATENT DOCUMENTS

| | | | |
|---|---|---|---|
| GB | 818646 A | * | 8/1959 |
| JP | 62-228738 A | | 10/1987 |
| JP | 6-042568 A | | 2/1994 |
| JP | 8-183488 A | | 7/1996 |
| JP | H08-270713 A | | 10/1996 |
| JP | 2007-298063 A | | 11/2007 |

* cited by examiner

*Primary Examiner* — Anna Momper
(74) *Attorney, Agent, or Firm* — Rabin & Berdo, P.C.

(57) ABSTRACT

A rotary member that displaces a valve member in an axial direction in accordance with a rotation operation is supported on an adjuster case coaxially with the valve member. A detent mechanism is constituted by a fluid chamber that applies a fluid pressure to the rotary member in a direction for separating from the valve member, a pressure-applying member fixed to the rotary member, and a pressure-receiving member that is fixed to the adjuster to support the pressure-applying member against a pressure of the fluid chamber. By forming an engagement portion that engages with the pressure-applying member in the pressure-receiving member, a dimension of the rotary member of the adjuster and an operation input can be suppressed to be small.

10 Claims, 3 Drawing Sheets

ADJUSTER AND SHOCK ABSORBER

FIELD OF THE INVENTION

This invention relates to an adjuster that adjusts an opening of a bypass passage connecting two chambers of a shock absorber, and more particularly to a detent mechanism of the adjuster.

BACKGROUND OF THE INVENTION

A suspension device for a rear wheel of a motorcycle or a steering ski of a snowmobile comprises a suspension spring that absorbs an impact from a road surface and a shock absorber that attenuates expansion and contraction of the suspension spring.

JP08-270713A, published by the Japan Patent Office in 1996, proposes an adjuster for adjusting a damping force generated by this type of shock absorber during contraction.

The adjuster increases or reduces the damping force generated by the shock absorber during contraction by varying a flow area of a bypass passage through which working oil flows from an oil chamber that contracts in accordance with the contraction operation of the shock absorber to a reservoir tank provided on an outer side of the shock absorber.

The adjuster comprises a rotary member that is caused to perform a rotation operation, and a detent mechanism that positions and holds the rotary member in a predetermined rotary angle position.

The detent mechanism comprises a ball that is biased by a spring to project in a radial direction from the rotary member, and a plurality of ball latching grooves formed at predetermined angular intervals in a wall surface of a housing surrounding the rotary member in order to receive the ball.

When the adjuster is inoperative, the ball engages with one of the ball latching grooves to prevent the rotary member from rotating unintentionally. When the rotary member is operated to rotate using a jig or the like, the ball retreats to an inner side of the rotary member against the spring such that the rotary member rotates. As the rotation operation of the rotary member continues, the ball engages with the ball latching grooves in sequence every time the rotary member rotates by a fixed angle.

The rotary member can be operated to rotate in intervals of the fixed angle in accordance with variation in an operation feeling generated as the ball engages with and separates from the ball latching grooves, and by stopping the rotation operation in an engagement position between the ball and an arbitrary ball latching groove, the rotary member is held by the detent mechanism in the rotary angle position reached when the rotation operation was stopped until the rotation operation is resumed.

SUMMARY OF THE INVENTION

In the adjuster according to the prior art, a hole portion oriented in the radial direction to house the spring and the ball supported by the spring must be formed on the inner side of the rotary member so that the ball projects in the radial direction from the inner side of the rotary member. Further, the plurality of ball latching grooves must be formed in the wall surface of the housing surrounding the rotary member.

Because of the need for these structures, it is difficult to reduce a diameter of the rotary member. It is also difficult to reduce a frictional resistance of a seal member provided between the rotary member and the housing while securing a sufficient sealing performance in the seal member, and the frictional resistance of the seal member tends to cause an increase in an operational input required for the rotation operation of the rotary member.

It is therefore an object of this invention to reduce a dimension of a rotary member of an adjuster and suppress an operational input required to rotate the rotary member.

In order to achieve the above object, an adjuster according to this invention comprises an adjuster case, a valve member housed in the adjuster case to be capable of displacing in an axial direction, a rotary member that is supported on the adjuster case coaxially with the valve member in order to displace the valve member in the axial direction in accordance with a rotation operation, and a detent mechanism interposed between the rotary member and the adjuster case.

The detent mechanism comprises a fluid chamber formed between the valve member and the rotary member to exert a fluid pressure on the rotary member in a direction for separating from the valve member, a pressure-applying member fixed to the rotary member, and a pressure-receiving member that is fixed to the adjuster case to support the pressure-applying member against a pressure of the fluid chamber. An engagement portion that engages with the pressure-applying member in a predetermined rotation position is formed on the pressure-receiving member.

The details as well as other features and advantages of this invention are set forth in the remainder of the specification and are shown in the accompanying drawings.

PREFERRED EMBODIMENTS OF THE INVENTION

Figure 1:
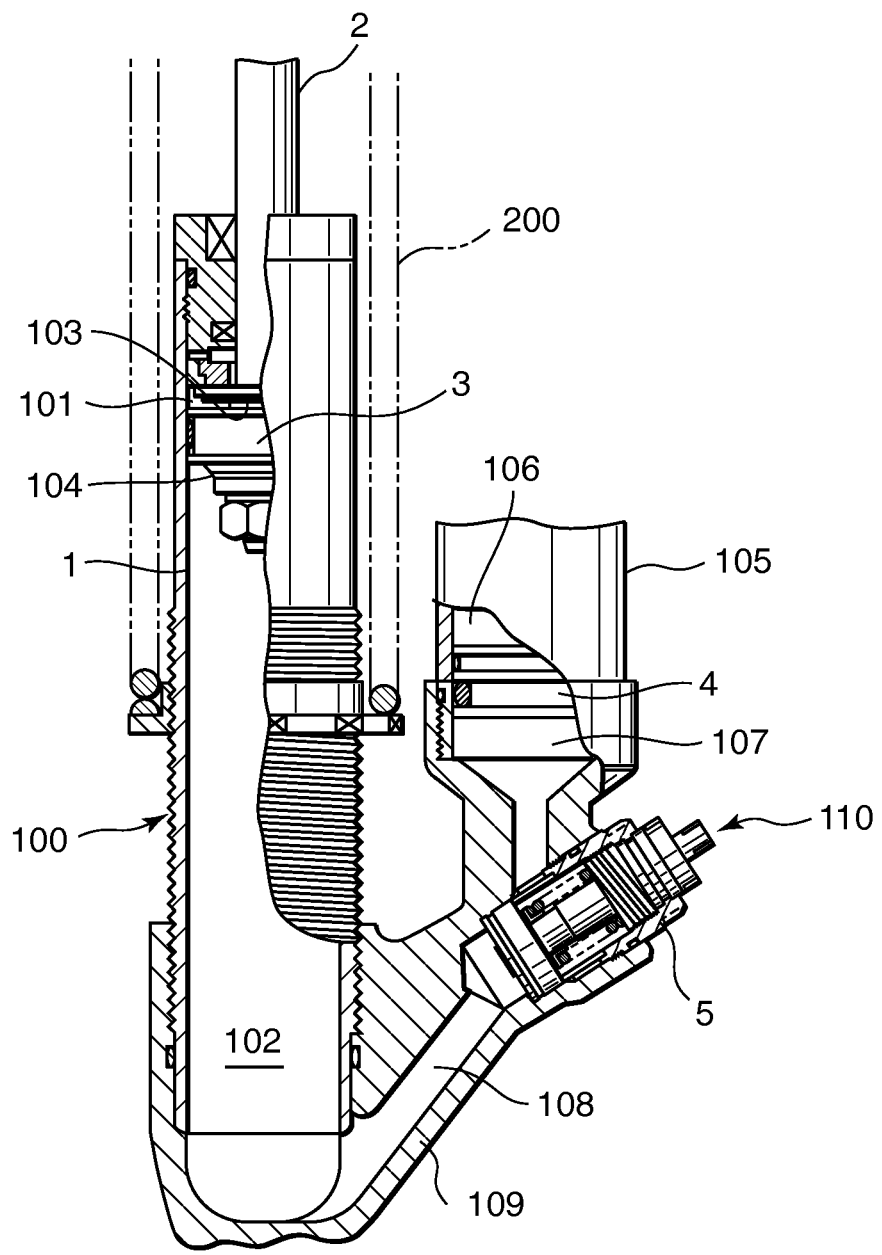
FIG. 1 is a longitudinal sectional view, including a partial side view, of the main parts of a suspension device including an adjuster according to this invention.

Referring to FIG. 1 of the drawings, a suspension device that supports a rear wheel of a motorcycle or a steering ski of a snowmobile comprises a suspension spring 200 that absorbs an impact from a road surface, and a shock absorber 100 that attenuates an expanding/contracting motion of the suspension device accompanying absorption of the impact.

The shock absorber 100 comprises a cylinder 1 into which working oil is charged, a piston rod 2 inserted into the cylinder 1 to be free to slide, a piston 3 fixed to a tip end of the piston rod 2 so as to slide on an inner periphery of the cylinder 1, and a cylindrical reservoir 105 provided on an outer side of the cylinder 1. A water-soluble working fluid may be used instead of the working oil.

The shock absorber 100 is latched to a vehicle body of the motorcycle or snowmobile via a vehicle body side bracket joined to an upper end, in the figure, of the piston rod 2, and latched to the rear wheel of the motorcycle or the steering ski of the snowmobile via a bottom side bracket joined to a lower end, in the figure, of the cylinder 1.

Two oil chambers 101 and 102 are defined inside the cylinder 1 by the piston 3. The oil chamber 101 formed around the piston rod 2 contracts in accordance with an expansion operation of the shock absorber 100 during which the piston rod 2 projects from the cylinder 1. The oil chamber 102 formed on an opposite side of the piston 3 to the piston rod 2 contracts in accordance with a contraction operation of the shock absorber 100 during which the piston rod 2 invades the cylinder 1.

An expansion side damping valve 104 that allows the working oil to move from the oil chamber 101 into the oil chamber 102 under a predetermined resistance and a contraction side check valve 103 that allows the working oil to move from the oil chamber 102 into the oil chamber 101 without resistance are provided on the piston 3.

The cylinder 1 and the reservoir 105 are connected via a housing 109 joined to a lower portion of the cylinder 1. A gas chamber 106 storing compressed gas and a working oil storage chamber 107 storing the working oil are defined inside the reservoir 105 by a free piston 4.

The free piston 4 slides on an inner periphery of the cylindrical reservoir 105. The free piston 4 absorbs variation in a volume ratio between the gas chamber 106 and the working oil storage chamber 107 by displacing in a vertical direction of the figure within the reservoir 105. The gas chamber 106 and the working oil storage chamber 107 may be separated by a bellows, a bladder, or the like instead of the free piston 4.

The working oil storage chamber 107 is connected to the oil chamber 102 via a connecting passage 108 formed in the housing 109. A gas pressure of the gas chamber 106 acts on the working oil storage chamber 107 at all times via the free piston 4. A valve assembly 5 is provided at a midway point on the connecting passage 108.

Figure 2:
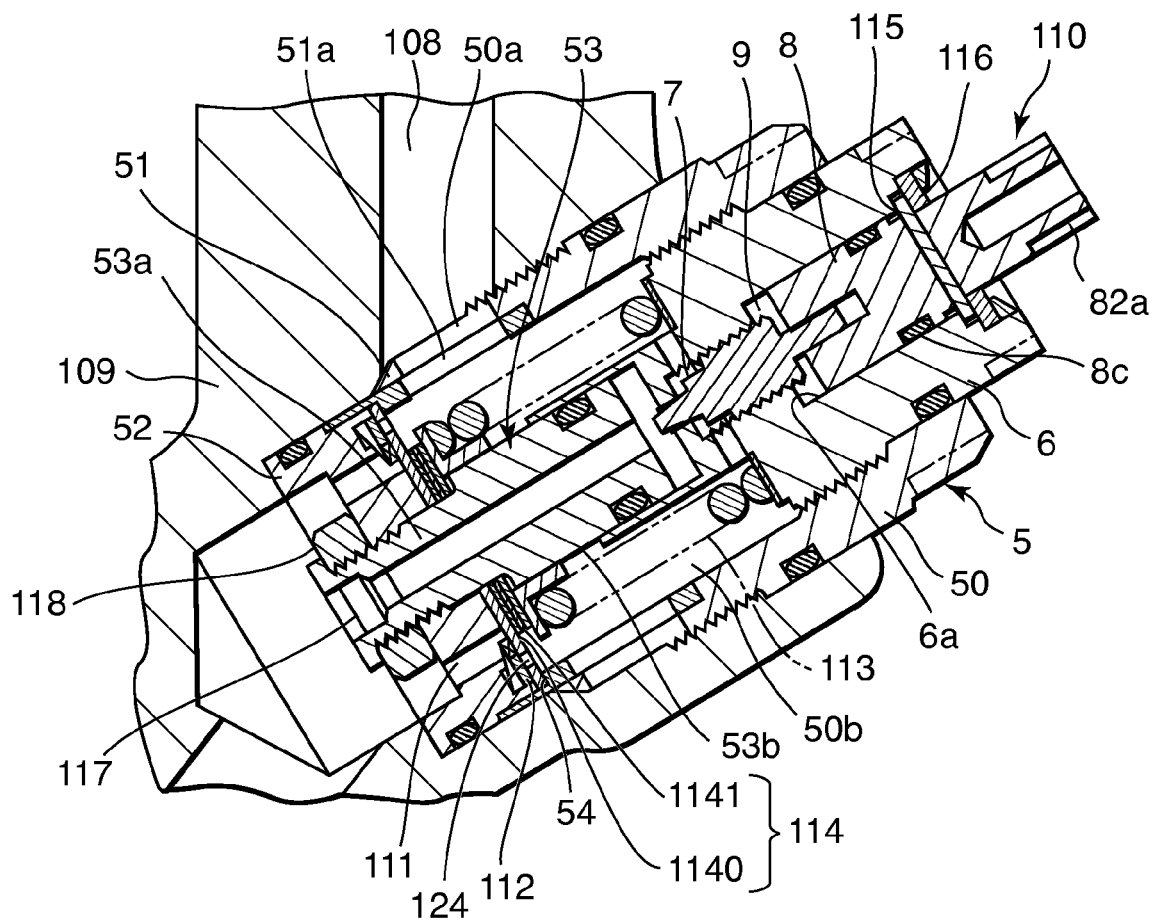
FIG. 2 is an enlarged longitudinal sectional view of a valve unit including the adjuster.

Referring to FIG. 2, the valve assembly 5 comprises a contraction side damping valve 114 that allows the working oil to move from the oil chamber 102 into the working oil storage chamber 107 under a predetermined resistance and an expansion side check valve 112 that allows the working oil to move from the working oil storage chamber 107 into the oil chamber 102 without resistance.

The shock absorber 100 attenuates the expanding/contracting motion of the suspension device by having the expansion side damping valve 104 and the contraction side damping valve 114 apply resistance to a flow of the working oil in accordance with a flow direction of the working oil as the piston rod 2 invades and withdraws from the cylinder 1, or in other words during the expansion and contraction operations of the shock absorber 100. Variation in a working oil volume of the cylinder 1 accompanying the expansion and contraction operations of the shock absorber 100 is absorbed by movement of the working oil between the reservoir 105 and the oil chamber 102.

In other words, during the expansion operation of the shock absorber 100 in which the piston rod 2 withdraws from the cylinder 1, the working oil flows from the oil chamber 101 into the oil chamber 102 through the expansion side damping valve 104. Further, an amount of working oil corresponding to a volume by which the piston rod 2 withdraws from the cylinder 1 flows from the working oil storage chamber 107 of the reservoir 105 into the oil chamber 102 via the expansion side check valve 112.

During the contraction operation of the shock absorber 100 in which the piston rod 2 invades the cylinder 1, the working oil flows from the oil chamber 102 into the oil chamber 101 through the contraction side check valve 103. Further, an amount of working oil corresponding to a volume by which the piston rod 2 invades the cylinder 1 flows from the oil chamber 102 into the working oil storage chamber 107 of the reservoir 105 via the contraction side damping valve 114.

To adjust a contraction side damping force generated by the contraction side damping valve 114 in response to the contraction operation of the shock absorber 100, the valve assembly 5 comprises an adjuster 110.

A bypass passage 117 is formed in the valve assembly 5 in parallel with the contraction side damping valve 114. The adjuster 110 adjusts the damping force generated by the contraction side damping valve 114 by increasing or reducing a flow passage area of the bypass passage 117.

The valve assembly 5 comprises a tubular case 50, a link member 51, and a disc-shaped partition wall member 52. The case 50 is screwed to the housing 109 such that the link member 51 and the partition wall member 52 are held fixedly in predetermined positions within the housing 109. A center rod 53 is fixed in a center of the partition wall member 52 by a nut 118. The center rod 53 penetrates the link member 51 so as to project into an inner side of the case 50.

A plurality of ports 111 penetrates the partition wall member 52 on an outer side of the center rod 53. A through whole 50a is formed in the case 50. Further, a through-hole 51a is formed in a part of the link member 51 overlapping the through-hole 50a. The connecting passage 108 connects the oil chamber 102 and the working oil storage chamber 107 to each other via the ports 111, a space 50b on the outer side of the center rod 53 in the case 50, and the through-holes 50a and 51a.

An annular seat 54 is sandwiched between the partition wall member 52 and the link member 51.

The bypass passage 117 is formed to penetrate a central portion of the center rod 53 fixed to the partition wall member 52. The center rod 53 comprises a main body portion 53b having an outer periphery exposed to the interior of the case 50, and a joint portion 53a having a smaller diameter than the main body portion 53b and joined to the partition wall member 52.

The contraction side damping valve 114 comprises a large diameter leaf 1140 that is fitted to an outer periphery of the joint portion 53a, and a plurality of small diameter leaves 1141. The leaves 1140 and 1141 are disposed in a stacked condition between the partition wall member 52 and a step formed between the main body portion 53b and the joint portion 53a of the center rod 53.

The large diameter leaf 1140 contacts the partition wall member 52 on an identical plane to the annular seat 54, and blocks a large part of the port 111.

An annular space 124 is formed between an outer periphery of the large diameter leaf 1140 and an inner periphery of the seat 54. The expansion side check valve 112 comprises an annular valve body that is elastically supported by a plate spring supported on the partition wall member 52, and shuts off the annular space 124 from the port 111 side.

The leaves 1140 and 1141 of the contraction side damping valve 114 are biased in a direction for shutting off the port 111 by a spring 113 disposed along the outer periphery of the center rod 53. The spring 113 is supported by an adjuster case 6 screwed to the inner periphery of the case 50. The damping force generated by the contraction side damping valve 114 is adjusted by operating the adjuster case 6 to rotate relative to the case 50 so as to vary a spring load of the spring 113.

Figure 3:
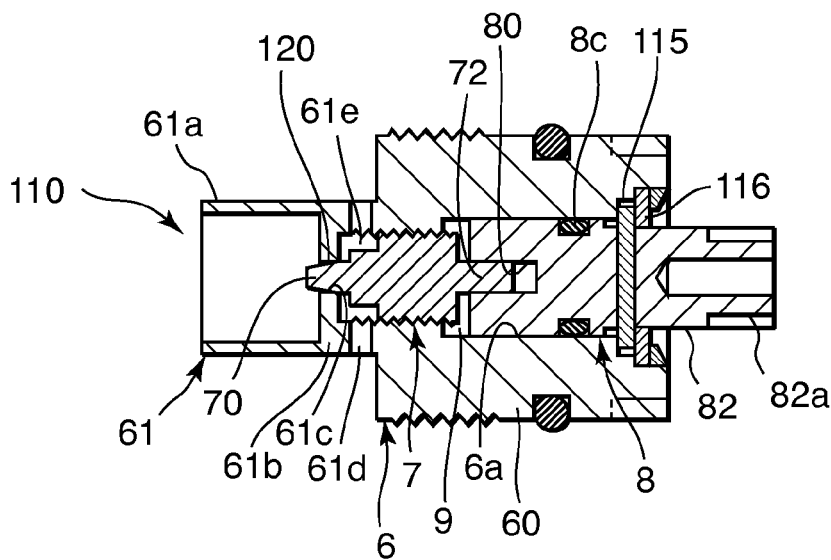
FIG. 3 is a longitudinal sectional view of the adjuster.

Referring to FIG. 3, the adjuster 110 is constituted by the adjuster case 6, a valve member 7, a rotary member 8, a pressure-applying member 115, and a pressure-receiving member 116. The adjuster case 6 comprises a cylindrical main body portion 60, and a projecting portion 61 having a smaller diameter than the main body portion 60 and fitted to the outer periphery of the center rod 53 so as to project from the main body portion 60. The bypass passage 117 penetrating the center rod 53 opens onto an inner side of the projecting portion 61.

The projecting portion 61 is constituted by a tubular portion 61a fitted to the outer periphery of the center rod 53, and a base portion 61b. An axial direction through-hole 61c is formed in a center of the base portion 61b. Further, a valve chamber 61e that communicates with the through-hole 61c and a plurality of radial direction through-holes 61d connecting the valve chamber 61e to the space 50b are formed in the base portion 61b.

The valve member 7 is screwed to the main body portion 60 of the adjuster case 6. The valve member 7 comprises a needle portion 70 that penetrates the valve chamber 61e so as to project into the through-hole 61c. The bypass passage 117 communicates with the working oil storage chamber 107 via a gap 120 between the through-hole 61c and the needle portion 70, the valve chamber 61e, the through-hole 61d, the space 50b, and the through-holes 50a and 51a.

A hollow portion 6a is formed in the main body portion 60 of the adjuster case 6 on an opposite side of the valve member 7 to the valve chamber 61e. A leg portion 72 having a rectangular cross-section is formed on the valve member 7 to project toward the hollow portion 6a in an opposite axial direction to the needle portion 70.

The rotary member 8 is formed in a columnar shape and fitted to the hollow portion 6a. A groove 80 for receiving the leg portion 72 is formed in the rotary member 8. By fitting the leg portion 72 into the groove 80, the groove 80 allows the leg portion 72 to displace in the axial direction while restricting rotation of the leg portion 72.

A seal member 8c is mounted on an outer periphery of the rotary member 8 so as to contact an inner periphery of the adjuster case 6. A pressure chamber 9 formed between the rotary member 8 in the hollow portion 6a and the valve member 7 communicates with the valve chamber 61e via a screw gap formed between the valve member 7 and the main body portion 60 of the adjuster case 6. Accordingly, a pressure of the working oil storage chamber 107 acts on the pressure chamber 9 at all times via the valve chamber 61e. The seal member 8c prevents the working oil from leaking out of the pressure chamber 9 to the outside of the adjuster case 6 due to this pressure.

A small diameter external force input portion 82 is formed integrally with a base end of the rotary member 8 so as to project in the axial direction from the adjuster case 6. An operating groove 82a for performing a rotation operation using a jig is formed in a projecting end of the external force input portion 82.

Figure 4:
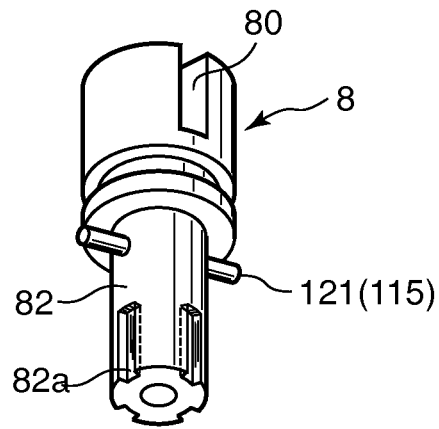
FIG. 4 is a perspective view of a rotary member according to this invention.

Referring to FIG. 4, the pressure-applying member 115 is constituted by a pin 121 that penetrates the external force input portion 82 in a cross-sectional direction.

Figure 5:
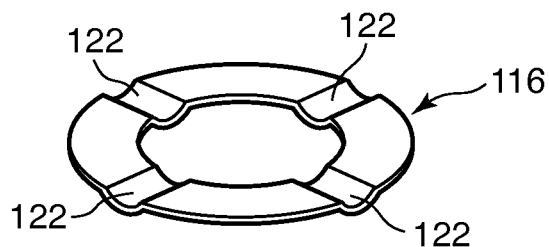
FIG. 5 is a perspective view of a pressure-receiving member according to this invention.

Referring to FIG. 5, the pressure-receiving member 116 is constituted by a washer in which radial direction grooves 122 are formed in four locations at equal angular intervals. The pressure-receiving member 116 sets a position of a circumferential direction displacement of the rotary member 8 and holds the rotary member 8 elastically in the set position by engaging with the pin 121 serving as the pressure-applying member 115 penetrating the external force input portion 82.

Referring back to FIG. 3, the pressure-receiving member 116 is fixed to an axial direction opening portion of the hollow portion 6a of the adjuster case 6 by welding, for example, so as to face the pressure-applying member 115. The pressure-applying member 115 and the pressure-receiving member 116 together constitute a detent mechanism of the adjuster 110.

During the expansion operation of the shock absorber 100, the amount of working oil in the cylinder 1 becomes deficient as the piston rod 2 withdraws from the cylinder 1. To compensate for this deficiency, the working oil in the working oil storage chamber 107 of the reservoir 105 flows into the reduced-pressure oil chamber 102 through the expansion side check valve 112 in the valve assembly 5 and the connecting passage 108 without resistance.

During the contraction operation of the shock absorber 100, the amount of working oil in the cylinder 1 becomes excessive as the piston rod 2 invades the cylinder 1. The surplus working oil flows out of the increased-pressure oil chamber 102 into the working oil storage chamber 107 of the reservoir 105 via the valve assembly 5.

The working oil that flows out of the oil chamber 102 into the working oil storage chamber 107 takes two paths through the valve assembly 5.

When the shock absorber 100 contracts at a low speed, the working oil that flows into the valve assembly 5 from the connecting passage 108 travels from the bypass passage 117 to the working oil storage chamber 107 through the gap 120 between the through-hole 61c and the needle portion 70, the valve chamber 61e, the space 50b, and the through-holes 51a and 50a. In this process, the gap 120 generates a damping force corresponding to an orifice characteristic thereof.

When the contraction speed of the shock absorber 100 increases, the damping force generated by the gap 120 increases rapidly. When, as a result, a differential pressure between upstream and downstream sides of the gap 120 exceeds a valve opening pressure of the contraction side damping valve 114, an outer peripheral portion of the large diameter leaf 1140 of the contraction side damping valve 114 deflects, thereby opening the contraction side damping valve 114. Thereafter, the working oil that flows into the valve assembly 5 from the connecting passage 108 travels to the working oil storage chamber 107 mainly through the contraction side damping valve 114.

When the contraction speed of the shock absorber 100 increases further, the large diameter leaf 1140 and the plurality of stacked small diameter leaves 1141 of the contraction side damping valve 114 displace against the spring 113 so as to retreat to the step between the main body portion 53b and the joint portion 53a of the center rod 53, thereby enlarging a flow area.

The valve opening pressure of the contraction side damping valve 114 is adjusted by operating the adjuster case 6 supporting the spring 113 to rotate relative to the case 50. Meanwhile, a flow rate of the connecting passage 108 at which the contraction side damping valve 114 opens is adjusted in accordance with a sectional area of the gap 120, or in other words an operation of the adjuster 110.

In the adjuster 110, the pressure of the working oil storage chamber 107 acts on the pressure chamber 9 at all times. The rotary member 8 is biased in a direction for separating from the valve member 7 at all times by this pressure such that the pin 121 is pressed against an inner side of the groove 122 in the pressure-receiving member 116 supported by the adjuster case 6.

When the external force input portion 82 of the rotary member 8 is operated to rotate using a jig, the pin 121 displaces in the circumferential direction to run on the surface of the pressure-receiving member 116 from the groove 122. When the external force input portion 82 is rotated further, the pin 121 engages with the adjacent groove 122. A different operation feeling is generated during the rotation operation of the rotary member 8 when the pressure-applying member 115 is removed from the grooves 122 and engaged with the grooves 122. Therefore, the rotation operation of the rotary member 8 is performed in accordance with a clicking sensation generated at predetermined angular intervals. When the rotation operation is not performed on the rotary member 8, on the other hand, the rotary member 8 is held in a predetermined angular position by the engagement between the pin 121 and the groove 122.

As described above, the detent mechanism including the adjuster 110 biases the pressure-applying member 115 toward the pressure-receiving member 116 using the pressure of the working oil storage chamber 107, which is led into the pressure chamber 9. Hence, there is no need to build a ball and a spring into the rotary member 8 in order to form the detent mechanism, and as a result, the detent mechanism can be realized with a simple configuration, enabling a reduction in a diameter of the rotary member 8.

When the rotary member 8 is formed with a small diameter, a diameter of the seal member 8c also decreases. Accordingly, frictional resistance between the seal member 8c and the adjuster case 6 decreases, and as a result, an operating force required in the rotation operation of the rotary member 8 can be reduced.

Further, by leading the pressure of the working oil storage chamber 107 into the pressure chamber 9, an axial direction pressure acting on the valve member 7 becomes constant. As a result, an operating pressure for causing the valve member 7 to advance and withdraw relative to the through-hole 61c during the rotation operation of the rotary member 8 remains constant at all times, regardless of an operation direction.

Hence, by employing the adjuster 110, the contraction side damping force of the shock absorber 100 can be adjusted easily.

The contents of Tokugan 2010-74188, with a filing date of Mar. 29, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, the pressure-applying member 115 may be formed by causing two short pins to project respectively into the external force input portion 82 instead of inserting the single pin 121 into the external force input portion 82. The pressure-applying member 115 may also be constituted by a single short pin projecting in only one direction from the external force input portion 82.

Figure 6:
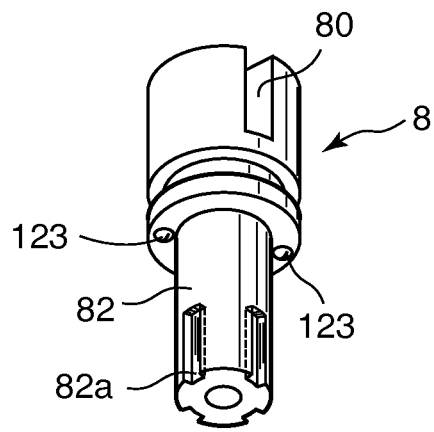
FIG. 6 is a perspective view of a rotary member according to another embodiment of this invention.

As shown in FIG. 6, the pressure-applying member 115 may be constituted by a hemispherical projection 123 instead of the pin 121.

Further, in the above embodiment, the pressure-receiving member 116 is constituted by a washer formed with the four grooves 122, but the pressure-receiving member 116 may also be constituted by a corrugated washer formed with a large number of radial direction grooves.

Furthermore, the pressure-applying member 115 may be constituted by a washer fixed to the rotary member 8 and the pressure-receiving member 116 may be constituted by a pin fixed to the adjuster case 6.

The contraction side damping valve 114 is not limited to that of the above embodiment, and may be applied to any construction capable of damping the contraction operation of the shock absorber 100. Further, the contraction side damping valve may be omitted, and instead, the adjuster according to this invention may be applied to a valve assembly that generates a contraction side damping force only in the gap 120 between the through-hole 61c and the needle portion 70.

The valve member 7 and the rotary member 8 may be coupled using any means other than the leg portion 72 and the groove 80 as long as relative displacement thereof in a rotation direction is restricted but relative displacement in the axial direction is permitted.

INDUSTRIAL APPLICABILITY

As described above, the adjuster according to this invention exhibits a favorable effect as an adjuster for adjusting a damping force of a shock absorber applied to a suspension device for a rear wheel of a motorcycle or a steering ski of a snowmobile.

The embodiments of this invention in which an exclusive property or privilege is claimed are defined as follows:

1. An adjuster comprising:
   an adjuster case;
   a valve member housed in the adjuster case to be capable of displacing in an axial direction;
   a rotary member that is supported on the adjuster case coaxially with the valve member in order to displace the valve member in the axial direction in accordance with a rotation operation; and
   a detent mechanism interposed between the rotary member and the adjuster case,
   wherein the detent mechanism comprises:
      a pressure chamber formed between the valve member and the rotary member to exert a fluid pressure on the rotary member;
      a pressure-applying member fixed to the rotary member to transmit the fluid pressure in the axial direction for separating from the valve member; and
      a pressure-receiving member that is fixed to the adjuster case to support the pressure-applying member against the fluid pressure transmitted in the axial direction by the pressure-applying member, and
   the pressure-receiving member comprises an engagement portion that engages with the pressure-applying member in a predetermined rotation position.

2. The adjuster as defined in claim 1, wherein the pressure-receiving member is constituted by a washer formed with a plurality of radial direction grooves that engage with the pressure-applying member.

3. The adjuster as defined in claim 2, wherein the pressure-applying member is constituted by a pin that projects in a radial direction from the rotary member.

4. The adjuster as defined in claim 2, wherein the pressure-applying member is constituted by a projection that projects in the axial direction from the rotary member.

5. The adjuster as defined in claim 1, wherein the adjuster case comprises:
   a tubular main body portion; and
   a projecting portion having a smaller diameter than that of the main body portion and projecting from the main body portion coaxially therewith,
   wherein the valve member is screwed to the main body portion so as to project to an inner side of the projecting portion, whereby the fluid pressure is led into the pressure chamber via a screw gap between the valve member and the main body portion.

6. The adjuster as defined in claim 5, wherein the projecting portion comprises a through-hole, and the valve member comprises a needle portion that invades the through-hole so as to vary a flow area of the through-hole in accordance with an axial direction displacement of the valve member.

7. A shock absorber comprising:
   a cylinder into which a working fluid is charged;

a piston that slides within the cylinder;
a piston rod joined to the piston so as to project from the cylinder;
a fluid chamber formed in the cylinder;
a working oil storage chamber provided on an outer side of the fluid chamber;
a damping valve that connects the fluid chamber and the working oil storage chamber;
a bypass passage that bypasses the damping valve; and
the adjuster as defined in claim 1, which varies a flow area of the bypass passage in accordance with an axial direction displacement of the valve member.

8. The adjuster as defined in claim 1, wherein the valve member is disposed to face a fluid passage, and a fluid pressure in the fluid passage on a downstream side of the valve member is led into the pressure chamber.

9. The adjuster as defined in claim 8, wherein the valve member is subjected to a fluid pressure in the pressure chamber and a fluid pressure in the fluid passage such that axial forces exerted on the valve member are balanced irrespective of a displacement position of the valve member in the axial direction.

10. The adjuster as defined in claim 9, wherein a fluid in the fluid passage is pressurized by a pressure source.

\* \* \* \* \*